(12) United States Patent
O'Connor et al.

(10) Patent No.: US 6,467,680 B1
(45) Date of Patent: Oct. 22, 2002

(54) OPTICAL BENCH ASSEMBLY SOLDER FIXTURE AND METHOD

(75) Inventors: Sean P. O'Connor, Wollaston, MA (US); Eric E. Fitch, Medford, MA (US)

(73) Assignee: Axsun Technologies, Inc., Billerica, MA (US)

( * ) Notice: Subject to any disclaimer, the term of this patent is extended or adjusted under 35 U.S.C. 154(b) by 58 days.

(21) Appl. No.: 09/685,533

(22) Filed: Oct. 10, 2000

(51) Int. Cl.[7] ............................................. B23K 31/02
(52) U.S. Cl. .................................. 228/245; 228/180.21
(58) Field of Search ................................ 228/245, 246, 228/254, 180.21, 180.1

(56) References Cited

U.S. PATENT DOCUMENTS 5,244,143 A * 9/1993 Ference et al. ........ 228/180.21
5,775,569 A * 7/1998 Berger et al. ................ 228/254
5,872,051 A * 2/1999 Fallon et al. ................ 438/616

* cited by examiner

Primary Examiner—M. Alexandra Elve
Assistant Examiner—Len Tran
(74) Attorney, Agent, or Firm—Grant Houston

(57) ABSTRACT

An assembly fixture for optical benches comprises a jig base, having at least one blind hole. The jig base is formed with a surface that is a non-wetting to solder material. The blind hole is shaped and sized in response to dimensions of the optical bench. The fixture further comprises a bench jig shroud. This shroud at least partially covers optical benches installed in the blind holes. Preferably, provisions are made in the top of the jig base at the interface with the jig shroud to facilitate its stable placement on the base.

6 Claims, 3 Drawing Sheets

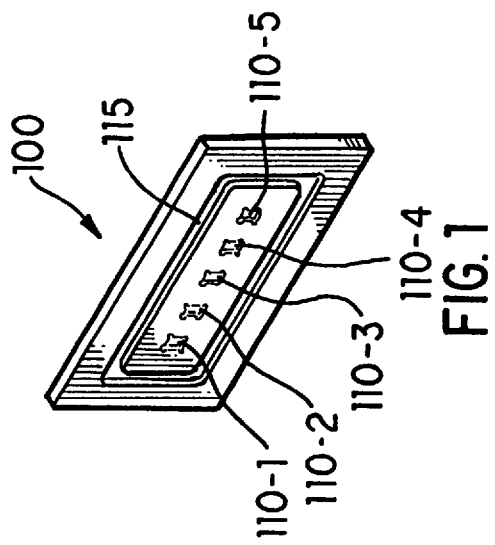
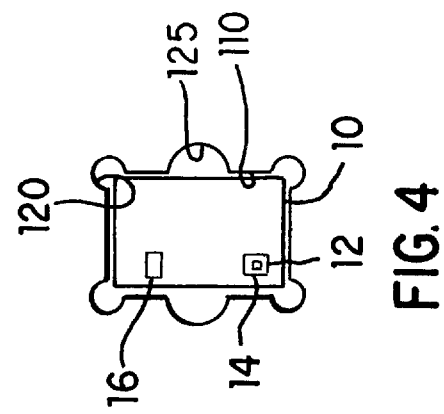
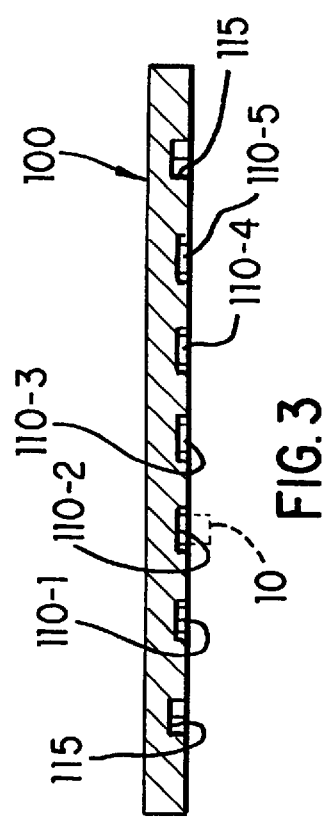
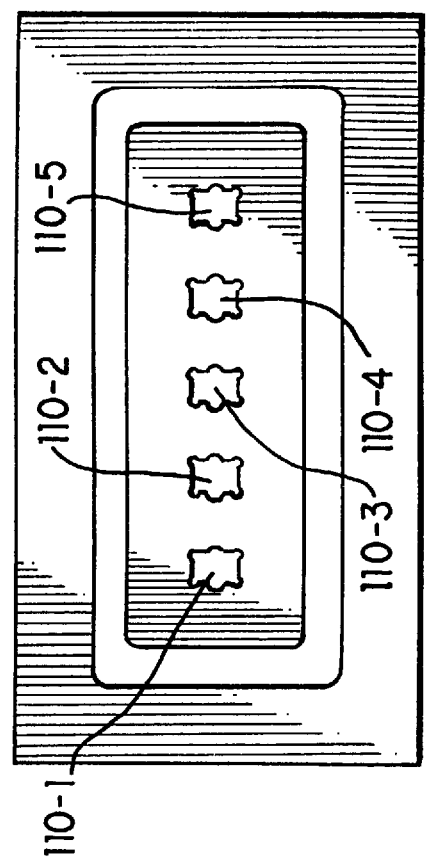

OPTICAL BENCH ASSEMBLY SOLDER FIXTURE AND METHOD

BACKGROUND OF THE INVENTION

Semiconductor opto-electronic packaging typically requires multiple devices/subassemblies to be solder-bonded to each other in a stack. For example, in the case of a typical semiconductor active device, the semiconductor laser diode chip is mounted on an intermediate substrate to form what is typically referred to as a hybrid. This hybrid is then mounted on a submount, which is in turn typically mounted on some sort of pedestal or thermo-electric cooler, for heat control in the module, such as a butterfly or DIP package. More recently, more integrated systems have been proposed in which multiple optical components are mounted on a single optical bench-submount.

Typically, each of these devices/ subassemblies is solder bonded to each other. The advantage of solder bonding is its high temperature stability as well as its long-term performance characteristics.

Generally, to create good solder bonds, especially at lower temperatures, flux is used to facilitate surface wetting by the molten solder. The use of flux, however, can lead to problems especially in applications utilizing high-power, active devices. Flux is an organic compound; and organics within the sealed module can decompose, especially at the exit facet of semiconductor lasers, for example. This leads to the deposition of carbon on the laser exit facet, which can result in excessive heat concentration, leading to catastrophic optical damage (COD). Thus, in manufacturing, after solder bonding, any remaining flux must be rigorously flushed from the module prior to lid sealing.

SUMMARY OF THE INVENTION

The present invention concerns an optical bench, or submount, tinning/pre-tinning jig. It is useful for solder coating submounts/benches and attaching optical components to the benches in solder reflow ovens, especially using solder preforms, solder coated components, or predeposited solder on the benches.

In general, according to one aspect, the invention features an assembly fixture for optical benches. The fixture comprises a jig base having at least one blind hole. The jig base is formed with a surface that is a non-wetting to solder material. The blind hole is shaped and sized in response to dimensions of the optical bench.

In a preferred embodiment, the fixture further comprises a bench jig shroud. This shroud at least partially covers optical benches installed in the blind holes. The blind holes have at least two opposed tool insertion notches. In one implementation, the depth of the blind hole is approximately one-half the thickness of the optical bench. Preferably, provisions are made in the top of the jig base at the interface with the jig shroud to facilitate its stable placement on the base. The jig shroud includes one or more through-holes to enable access to a top surface of the bench installed on the base.

In general, according to another aspect, the invention can also be characterized in the context of an assembly process for an optical bench. The process comprises the placement of an optical bench in the blind hole. A solder preform is placed between the bench and the jig base. The jig with the optical bench is then heated in a solder reflow oven so as to melt the preform so that the solder is deposited on the underside of the bench when the bench is thereafter cooled.

In some embodiments, optical components, such as components requiring only low precision placement are installed on the optical bench prior reflow. Thus, in one reflow cycle, the bottoms of the benches are solder coated and optical components are installed on the bench top surfaces.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 1 is a perspective view of a jig base according to the present invention;

FIG. 2 is a top plan view of the inventive jig base;

FIG. 3 is a cross-sectional view of the inventive jig base;

FIG. 4 is a partial plan view showing the details of the blind hole in FIG. 2 with a bench installed in the hole;

DETAILED DESCRIPTION OF THE PREFERRED EMBODIMENTS

Figure 5:
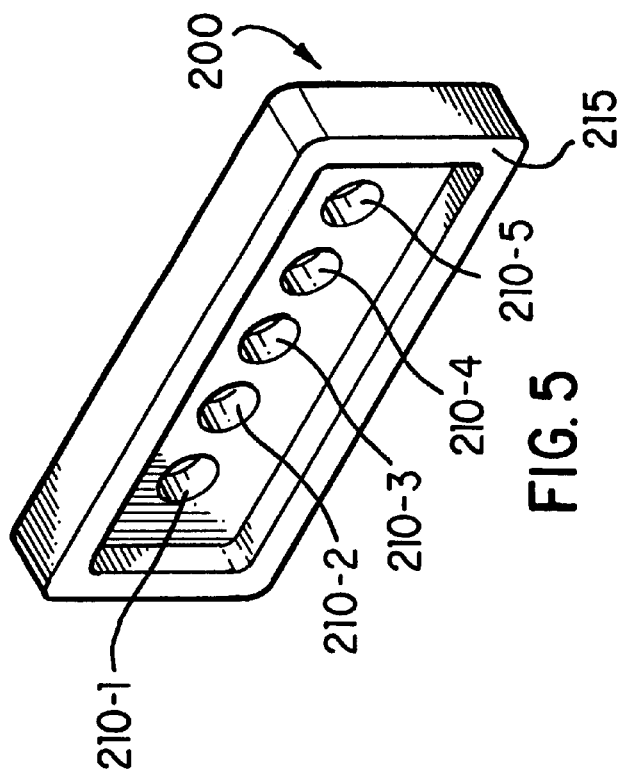
FIG. 5 is a perspective view of the jig shroud;.according to the present invention.

This invention is a fixture for holding micro-optical benches during certain fabrication operations and a method of performing those operations. Preferably, the fixture includes a bench jig base, shown in FIG. 1 for example, and a bench jig shroud, shown in FIG. 5 for example. The bench jig base holds the benches during the operations and the shroud protects certain components on the base or benches that might otherwise move detrimentally.

FIG. 1 shows a bench jig base, which has been constructed according to the principles of the present invention.

Generally, the base 100 is constructed from a single, monolithic piece of material. Preferably, the thermal properties of the material, such as its thermal expansion coefficient, are matched to the optical benches across the temperature range of interest. Specifically, the thermal co-efficient of the bench is matched to the base 100 between room temperature and the solder melting temperature of, for example, about 250° C., when performing 80/15/5 In/Pb/Ag soldering. In the present embodiment, the benches are constructed from silicon, silicon oxide, aluminum nitride, or beryllium nitride.

The base 100 is also constructed from, according to the invention, a material that is non-wetting to solder material. In alternative embodiments, the bench is simply coated with a non-solder wetting material. This second implementation, however, is viewed as non-ideal since it requires thermal expansion matching between the non-wetting surface and the substrate of the jig to prevent delamination as a result of temperature cycling.

In the present embodiment, the base 100 is constructed from a machinable glass ceramic, having a continuous use temperature of about 800° C. Its coefficient of thermal expansion matches most metals and sealing glasses. It is nonwetting, exhibits zero porosity, and will not deform. And, it will not outgas in vacuum environments. Presently, MACOR material is used.

One or more blind holes 110 are formed in the base 100. Specifically, in the illustrated embodiment, five blind holes 110-1 to 110-5 are formed linearly across the center axis of the base 100. These blind holes 110 are sized in response to the bench or submount workpieces. Typically, they are sized to be slightly larger than the benches to confine the benches, but allow for the easy insertion into and removal from the blind holes 110.

In the preferred embodiment, the base 100 further comprises a shroud alignment feature 115. In the illustrated embodiment, this alignment feature is a trench or channel extending in a complete circumference around the blind holes 110-1 to 110-5.

FIG. 2 shows the arrangement of the blind holes 110-1 to 110-5 in the top surface of the base 100. In the specific illustrated embodiment, the center-to-center spacing between the blind holes is 0.472 inches (1.2 centimeters (cm)). The total length of the base is approximately 4 inches (about 10.2 cm). The width is approximately 2 inches (5.08 cm).

FIG. 3 shows a cross-section of the base 100. It illustrates the depth of the blind holes 110-1 to 10-5. In the illustrated implementation, the depth of the holes is approximately 0.04inches or 1.01 mm. This depth of the blind holes 110 corresponds to approximately one-half the height of the benches 10 that are inserted into the blind holes during operation. Specifically, according to the preferred embodiment, the benches are approximately 0.08 to 0.10 inches (2.03 to 2.54 mm) in thickness.

FIG. 4 illustrates an exemplary one of the blind holes 110. Specifically, the width of the blind hole is approximately 0.15 inches or 4 mm. Its length is approximately 0.25 inches or about 6 mm. Generally, the holes are less than 10 mm by 14 mm to hold benches of corresponding size. The configuration of the blind hole 110 is generally rectangular to accommodate a bench 10, when it is installed in the blind hole.

To facilitate easy installation and removal of the bench, however, the corners of the blind hole are relieved as indicated by reference numeral 120. Further, there are at least two, opposed insertion/extraction tool clearances 125.

In one embodiment, optical component and/or electrical components are placed on the bench 10 after the bench is inserted into its blind hole 100. In one implementation, the components 14 are places on predeposited solder areas 12 on the bench. Alternatively, a solder layer is located between the component 16 and the bench 10 either as a layer on the component or a separate preform.

FIG. 5 shows the shroud 200 that fits over the base 100. Specifically, the shroud in one embodiment has five throughholes 210-1 to 210-5 that have center-to-center spacings that are the same as the center-to-center spacings between the blind holes of the base 100. Further, the shroud 200 has a mating alignment feature 215 that is compatible with the alignment feature 115 of the base 100. In the illustrated embodiment, the shroud alignment feature 215 is a lip that fits into the trough of the base 100. The orientation of the lip 215 relative to the through holes 210 and the trough 115 relative to the blind holes 110 is such that, when the shroud is installed on the base and properly aligned, the throughholes 210 are positioned over the corresponding blind holes 110.

In the typical application, the shroud functions to protect the benches and any components on the benches from having their orientations disturbed during the reflow process. Typically, gas currents in reflow oven are strong enough to push low mass components especially after solder melting.

Figure 6:
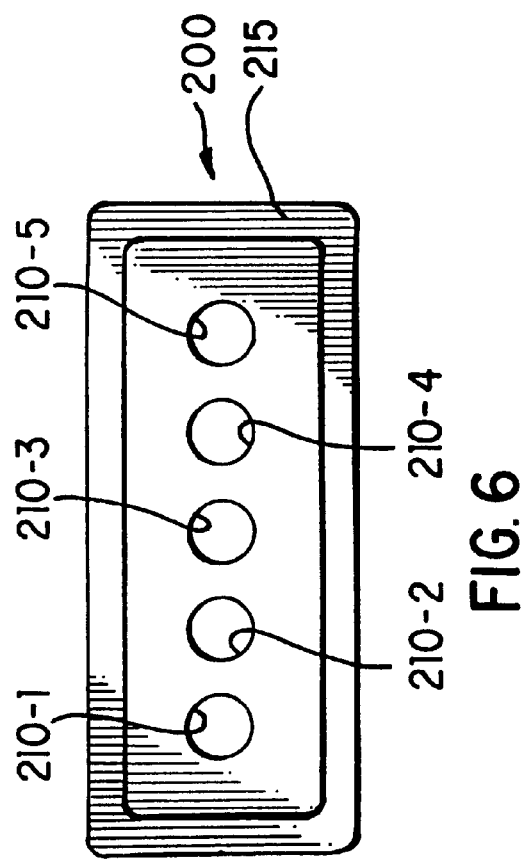
FIG. 6 is a plan view of the underside of the inventive jig shroud.

FIG. 6 shows the size and orientation of the through holes 210-1, 210-5. In the illustrated implementation, the diameter of the holes is 0.32 inches.

Figure 7:
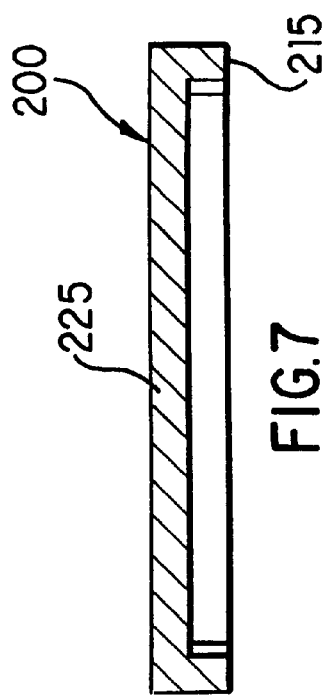
FIG. 7 is a cross-sectional view of the jig shroud.

FIG. 7 shows a cross sectional view of the shroud 200 and specifically illustrates the height of the lip 215 above the generally flat top lid 225 of the shroud 200. Specifically, the height of the lip 115 is approximately 0.18 inches or 4.6 mm. This height must be greater than the depth of the trough in the base, plus one-half the height of the benches, plus a clearance for the solder preforms in the illustrated embodiment. In other embodiments, further clearance is provided corresponding to the height of any optical or electrical components on the bench.

Figure 8:
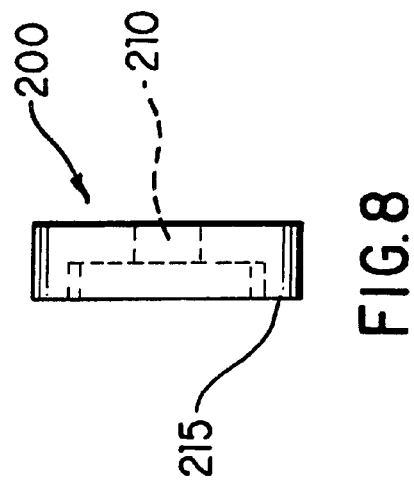
FIG. 8 is a side view of the inventive jig shroud.

FIG. 8 is a side view showing the through-holes 210 and lip configuration 215 in phantom.

Figure 9:
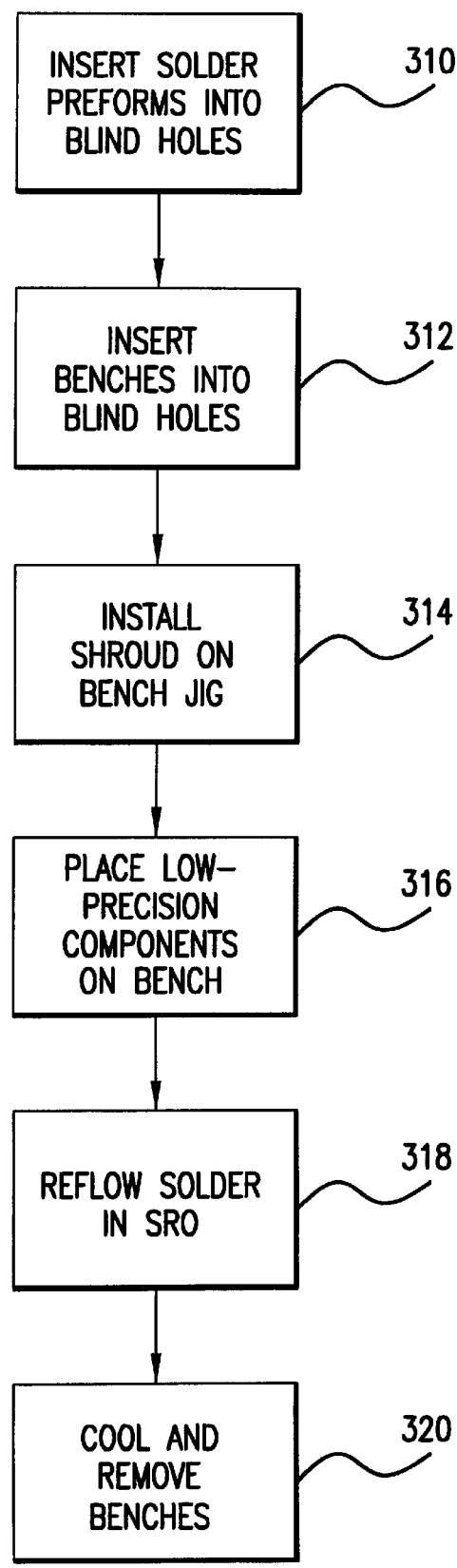
FIG. 9 is a flow diagram illustrating the bench pre-tinning process of the present invention.

FIG. 9 is a flow diagram illustrating the process steps involved in bench pretinning using the inventive bench pretinning jig of the present invention. Specifically, in a first step 310, solder preforms are inserted into the blind holes 110. In one embodiment, these solder preforms are a gold-tin solder composition, such as an 80–20 gold tin solder. In one other implementation, an 80/15/5 In/Pb/Ag low temperature solder is used. This solder is selected because currently, the benches 10 come with optical components precision placed and gold-tin bonded to the surface. The components should not move during subsequent reflow. Thus, a low temperature solder is used in combination with a low temperature reflow cycle.

Then, in step 312, the benches 10 are inserted into the blind holes 110 on top of the respective solder preforms.

In step 314, after all the benches are installed in the respective blind holes 110, the bench shroud 200 is installed on top of the bench 100.

In a low precision component placement process, optical and/or electrical components such as photodetector and thermistors 14, 16 are placed on the bench 10 via the shroud through holes 210 in step 316. This placement, in a one case, is accomplished manually using vacuum chuck tools. In other cases, it performed using semi-precise pick-and-place machines. Generally, the components are place with a precision of +/−100 microns, typically +/−50 microns.

Then, the jig, comprising the shroud 200 and base 100, is placed in a solder reflow oven (SRO) in step 318. The SRO heats the benches in a controlled atmosphere to a controlled temperature. In the particular implementation, an inert gas is used, such as hydrogen forming gas. The solder reflow oven is heated to controlled temperature/gas/-pressure profile to reflow the solder. For example, in one implementation, the temperature profile progresses from a mid dwell to a hot dwell, followed by a cool dwell. Simultaneously, the pressure is cycled to removed oxygen while blowing nitrogen and hydrogen forming gas. Under these environmental conditions, no flux is required to achieve solder wetting. Further, since the base 100 is non-wetting to the solder material, the material of the molten solder preform adheres to the undersurface of the bench 10 when solidified.

Finally, in step 320, the benches and base and shroud are removed from the solder reflow oven and allowed cool. During this cooling process, the solder adheres to the undersides of the benches, but not to the base 100.

These solder coated benches are then attached to a thermoelectric cooler in a module. Specifically, the benches are placed on the thermoelectric cooler and the cooler reversed biased to heat and reflow the solder coating on both the cooler and the bench, as described herein. In present implementation, the solder in the cooler reflows at 232° C., but for adequate is surface wetting, without flux, the In/Pb/Ag solder must be heated to above 250° C. With the present invention, the precoated benches need to be heated to only about 200° C., to fuse the solder between the benches and cooler, which temperature is well below the temperature at which the cooler would be damaged. This is possible since with the precoating no surface wetting is required.

While this invention has been particularly shown and described with references to preferred embodiments thereof, it will be understood by those skilled in the art that various changes in form and details may be made therein without departing from the scope of the invention encompassed by the appended claims.

What is claimed is:

1. An assembly process for an optical bench, comprising the steps of:
   placing an optical bench in a blind hole of a jig;
   placing components on a top of the bench, wherein solder is between the bench and the components;
   placing solder between a bottom of the bench and the jig; and
   heating the jig with the optical bench in an oven to reflow solder to attach the solder to bottom of the bench and the components to the top of the bench.

2. An assembly process as claimed in claim 1, further comprising covering the optical bench in the blind hole with a bench jig shroud.

3. An assembly process as claimed in claim 2, further comprising aligning the bench jig shroud with the jig with an alignment feature formed on the jig.

4. An assembly process as claimed in claim 1, further comprising placing components on bench through the jig shroud.

5. An assembly process as claimed in claim 4, further comprising attaching the components during the heating step.

6. An assembly process as claimed in claim 1, further comprising placing the bench on a thermoelectric cooler and reverse biasing the cooler to reflow the solder.

* * * * *